United States Patent
Blickley et al.

(10) Patent No.: US 8,470,082 B2
(45) Date of Patent: Jun. 25, 2013

(54) SYSTEMS USING MASS FLOW PROMOTING INSERT WITH GAS PURGING AND METHODS THEREOF

(75) Inventors: William J. Blickley, Scott Depot, WV (US); Mark W. Blood, Hurricane, WV (US); Glenn W. Baldwin, South Charleston, WV (US)

(73) Assignee: Univation Technologies, LLC, Houston, TX (US)

( * ) Notice: Subject to any disclaimer, the term of this patent is extended or adjusted under 35 U.S.C. 154(b) by 222 days.

(21) Appl. No.: 13/128,357

(22) PCT Filed: Oct. 23, 2009

(86) PCT No.: PCT/US2009/061816
§ 371 (c)(1),
(2), (4) Date: May 9, 2011

(87) PCT Pub. No.: WO2010/062526
PCT Pub. Date: Jun. 3, 2010

(65) Prior Publication Data
US 2011/0219952 A1 Sep. 15, 2011

Related U.S. Application Data

(60) Provisional application No. 61/200,261, filed on Nov. 26, 2008.

(51) Int. Cl.
*B01D 45/12* (2006.01)
(52) U.S. Cl.
USPC ............... 95/271; 55/455; 95/267; 95/260; 95/262; 96/220; 96/204; 96/197; 96/372; 96/379; 96/378; 528/502 R; 528/483

(58) Field of Classification Search
USPC .................. 55/455; 528/502 R, 483; 95/267, 95/271, 260, 262; 96/220, 204, 197, 372, 96/379, 378
See application file for complete search history.

(56) References Cited

U.S. PATENT DOCUMENTS

| | | | |
|---|---|---|---|
| 1,415,830 A | 5/1922 | Fredel et al. |
| 3,198,492 A | 8/1965 | Schneider |
| 3,258,252 A | 6/1966 | Lanier |
| 3,751,009 A | 8/1973 | Archer |
| 3,797,707 A | 3/1974 | Jenike et al. |

(Continued)

FOREIGN PATENT DOCUMENTS

| EP | 0127253 B1 | 1/1988 |
|---|---|---|
| EP | 0339122 A | 11/1989 |

(Continued)

*Primary Examiner* — Jason M. Greene
*Assistant Examiner* — Dung H Bui
(74) *Attorney, Agent, or Firm* — Jennifer A. Schmidt; Leandro Arechederra, III (57) ABSTRACT

A system in one embodiment includes a barrier; an inverted cone in the barrier; and a member under the inverted cone and having dimensions that cause solids passing therealong between the member and the barrier to have about a constant velocity profile thereacross. A method for purging a gas from a solid/gas mixture according to one embodiment includes adding solids to a barrier having an inverted cone therein and a member under the inverted cone, wherein the solids passing along the member have about a constant vertical velocity profile thereacross; and injecting a purge gas into the solids from at least one point adjacent the member.

16 Claims, 5 Drawing Sheets

U.S. PATENT DOCUMENTS

| | | |
|---|---|---|
| 3,871,626 A | 3/1975 | Wohlfarth |
| 3,920,624 A | 11/1975 | Humkey et al. |
| 4,128,343 A | 12/1978 | Moked et al. |
| 4,159,881 A | 7/1979 | Gogneau |
| 4,286,883 A | 9/1981 | Johanson |
| 4,372,758 A | 2/1983 | Bobst et al. |
| 4,473,300 A | 9/1984 | Goins |
| 4,478,517 A | 10/1984 | Hoppe et al. |
| 4,758,654 A | 7/1988 | Brod et al. |
| 4,792,235 A | 12/1988 | Paul |
| 4,822,173 A | 4/1989 | Paul |
| 4,941,779 A | 7/1990 | Dewitz et al. |
| 5,129,766 A | 7/1992 | Dirkse et al. |
| 5,248,197 A | 9/1993 | Storf et al. |
| 5,277,492 A | 1/1994 | Paul |
| 5,462,351 A | 10/1995 | Royal |
| 5,534,047 A * | 7/1996 | Gisko et al. ................ 95/24 |
| 7,114,638 B2 | 10/2006 | Vaynshteyn et al. |
| 2007/0228078 A1 | 10/2007 | Sanders |

FOREIGN PATENT DOCUMENTS

| | | |
|---|---|---|
| EP | 1591457 A | 11/2005 |
| EP | 1832404 A | 9/2007 |
| EP | 1832620 A | 9/2007 |
| GB | 141468 A | 4/1920 |
| WO | WO 03/011920 A1 | 2/2003 |
| WO | WO 2004/039848 A | 5/2004 |

* cited by examiner

SYSTEMS USING MASS FLOW PROMOTING INSERT WITH GAS PURGING AND METHODS THEREOF

CROSS-REFERENCE TO RELATED APPLICATIONS

This application is a National Stage application under 36 U.S.C. §371 of International Application No. PCT/US2009/061816, filed Oct. 23, 2009, that claims the benefit of Ser. No. 61/200,261, filed Nov. 26, 2008, the disclosures of which are incorporated by reference in their entireties.

FIELD OF THE INVENTION

The invention generally relates to the addition and/or removal of gas from a solid/gas mixture flowing through a vessel. In particular, this disclosure relates to using an inverted cone and insert that promote solids mass flow and provide void spaces to add and/or remove gases from a solid/gas mixture travelling through a vessel.

BACKGROUND

Usually, polyolefin polymerization processes make use of a purge bin after the reactor vessel to remove unwanted volatiles from the polymer resin. The purge bin is a vessel where a resin mixture enters the upper portion of the vessel and is subjected to purging gas through ports or openings at the bottom of the vessel and possibly along the sides and other areas of the vessel to remove the volatiles through a purging effect. (See, for example, U.S. Pat. Nos. 3,797,707, 4,286,883, 4,758,654, and 5,462,351.)

However, simply piping a purging gas into the resin without taking into account solids flow distribution, distribution of the purging gas through the resin, resin flow patterns, and any potential heating effect of the purging gas can result in damage to the resin and possibly lead to poor or non-commercially viable polymer products. In addition, the time that the resin is exposed to the purging gas also affects the degree to which the volatiles are removed from the resin.

The interface between the resin and the purge bin along with any associated projections (such as pipes, tubes, supports, etc., that may protrude into the resin flow path) also has an effect on the flow rate of the resin through the purge bin. Since volatiles are purged from the resin at a rate dependent on the time of contact between the resin and the purge gas, any uneven flow pattern of the resin (i.e., slower or faster resin flow) will affect the amount of volatiles that are purged. Accordingly, the amount of volatiles removed differs from one portion of the purge bin to another dependent on the flow pattern of the resin.

Therefore, the resin flow through the purge bin should be decreased such that the portion of the resin that is exposed to the purging gas for the least amount of time (i.e., the portion of the resin moving the fastest through the purge bin), has sufficient contact time with the purge gas to remove the desired amount of volatiles. This decrease in the overall solids flow rate through the purge bin results in more time needed to purge the resin after polymerization, thus, decreasing the efficiency of the entire process.

Therefore, a more uniform cross-sectional flow rate of the resin through the purge bin is desirable to promote a more uniform resin residence time and dispersion of purging gas through the resin, so that less time is needed to purge the volatiles from the resin to an acceptable level.

SUMMARY

A system in one embodiment includes a barrier; an inverted cone in the barrier; and a member under the inverted cone and having dimensions that cause solids passing therealong between the member and the barrier to have about a constant velocity profile thereacross.

A system in another embodiment includes a barrier having a central portion between opposite upper and lower ends thereof, the central portion having about a constant inner diameter therealong; a member in the barrier towards a lower end thereof, wherein an outer diameter of the member is from about 50% and about 95% of an inner diameter of a portion of the barrier adjacent thereto; and an inverted cone for deflecting solids from a top end of the member.

A method for purging a gas from a solid/gas mixture according to one embodiment includes adding solids to a barrier having an inverted cone therein and a member under the inverted cone, wherein the solids passing along the member have about a constant vertical velocity profile thereacross; and injecting a purge gas into the solids from at least one point adjacent the member.

DETAILED DESCRIPTION

Before the present compounds, components, compositions, devices, equipments, configurations, schematics, systems, and/or methods are disclosed and described, it is to be understood that unless otherwise indicated this invention is not limited to specific compounds, components, compositions, devices, equipments, configurations, schematics, systems, methods, or the like, as such may vary, unless otherwise specified. It is also to be understood that the terminology used herein is for the purpose of describing particular embodiments only and is not intended to be limiting.

It must also be noted that, as used in the specification and the appended claims, the singular forms "a," "an" and "the" include plural referents unless otherwise specified.

Generally, embodiments disclosed herein relate to methods and systems of adding and/or removing gas from a purge bin. For example, embodiments disclosed herein relate to systems and methods for removing volatiles from a resin as it flows through a mass flow purge bin, preferably in a "plug flow" fashion.

Other general embodiments include methods for purging a gas from a solids/gas mixture where the solids/gas mixture flows through a purge bin, contacts an inverted cone with a member under the cone, and has about a constant vertical velocity profile thereacross. The embodiments herein further include injecting purge gas into the solids from at least one point adjacent the member.

The term "purge" as used herein refers to the process of removing unwanted dissolved and undissolved gases, including hydrocarbons and/or volatiles, from a solid granular polymer that has interstitial space filled with gas. In addition to the interstitial gas, hydrocarbons may be dissolved in the resin. The purging operation consists of creating a sufficient driving force to cause the absorbed hydrocarbon to diffuse from the resin. The hydrocarbons in the interstitial space are quickly displaced with purge gas, but the dissolved hydrocarbons are slow to come out, with the relative rate of diffusion dependent on the Molecular Weight (MW) of the hydrocarbon (large molecules diffuse out more slowly).

The term "volatiles" as used herein refers to a component or compound that has a low relative boiling point compared with the components or compounds around it. Illustrative volatiles include, but are not limited to, nitrogen, water, ammonia, methane, carbon dioxide, and all compounds of oxygen, carbon, and hydrogen.

The term "solid" as used herein refers to any solid material, such as resin, grain, metallic particles, etc. For example, a solid that is included in a solids/gas mixture may be a polymer resin that has been processed to a form which includes volatiles that are to be removed before the resin is stored or further processed.

The term "solids/gas mixture" as used herein refers to any substance including any solid, liquid, or gaseous substance, including any mixture thereof. For example, a solids/gas mixture might refer to a mixture of volatile gases, polymer resin, and purge gas, or in some instances, it may refer only to polymer resin and/or purge gas, etc.

The term "resin" as used herein refers to an intermediary or final material in the polymerization process. The resin may be a solid or a mixture of solids and interstitial gas or gases. For example, a resin may include any olefin monomer including substituted and unsubstituted alkenes having two to 10 carbon atoms, such as ethylene, propylene, 1-butene, 1-pentene, 1-hexene, 1-octene, 1-decene, 1-dodecene, styrene, and derivatives and mixtures thereof, along with other impurities such as volatiles, liquids, etc. Both unreacted monomers (alkenes) and non-reactive alkanes may be dissolved in the resin and both alkanes and alkenes may comprise parts of the interstitial gas. Illustrative nonreactive alkanes include, but are not limited to, propane, butane, isobutane, pentane, isopentane, hexane, isomers thereof and derivatives thereof.

The term "mass flow" as used herein refers to a unique flow condition where smooth surfaces and steep slopes of a vessel enable all the solids in the vessel to be in motion when solids are discharged from the vessel.

The term "plug flow" as used herein refers to a subset of mass flow where substantially all of a certain material, solid, gas, liquid, or combination thereof, in a vessel at a given point has about a uniform velocity profile. For example, in a vertically oriented purge bin, plug flow may be achieved when the solids/gas mixture in the purge bin at a given level is traveling vertically downward at substantially the same velocity. In another example, in a vertically oriented purge bin, plug flow may be achieved when the solid(s) in the solids/gas mixture is travelling vertically downward at about the same velocity at a given level in the purge bin.

The term "surface interface" as used herein refers to the area of contact between a gaseous environment and a solid or semi-solid material surface. For example, downstream from each gas injection point, there may be an area of solids/gas mixture where the injected gas interacts with a surface of the solids/gas mixture.

In one general embodiment, a system comprises a barrier, an inverted cone in the barrier, and a member under the inverted cone and having dimensions that cause solids passing therealong between the member and the barrier to have about a constant velocity profile thereacross.

In another general embodiment, a system comprises a barrier having a central portion between opposite upper and lower ends thereof, the central portion having about a constant inner diameter therealong; a member in the barrier towards a lower end thereof, wherein an outer diameter of the member is from about 50% and about 95% of an inner diameter of a portion of the barrier adjacent thereto; and an inverted cone for deflecting solids from a top end of the member.

In yet another general embodiment, a method for purging a gas from a solid/gas mixture comprises adding solids to a barrier having an inverted cone therein and a member under the inverted cone, wherein the solids passing along the member have about a constant vertical velocity profile thereacross; and injecting a purge gas into the solids from at least one point adjacent the member.

The term "constant velocity profile" as used herein refers to, for example, the solid(s) in a medium such as a solids/gas mixture at a given level preferably in a vertically oriented purge bin travelling downward (in a class of embodiments, vertically downward) in the purge bin at or about the same velocity. The term "constant vertical velocity profile" as used herein refers to, for example, the solid(s) in a medium such as a solids/gas mixture at a given level in a vertically oriented purge bin traveling vertically downward in the purge bin at or about the same velocity.

Figure 1:
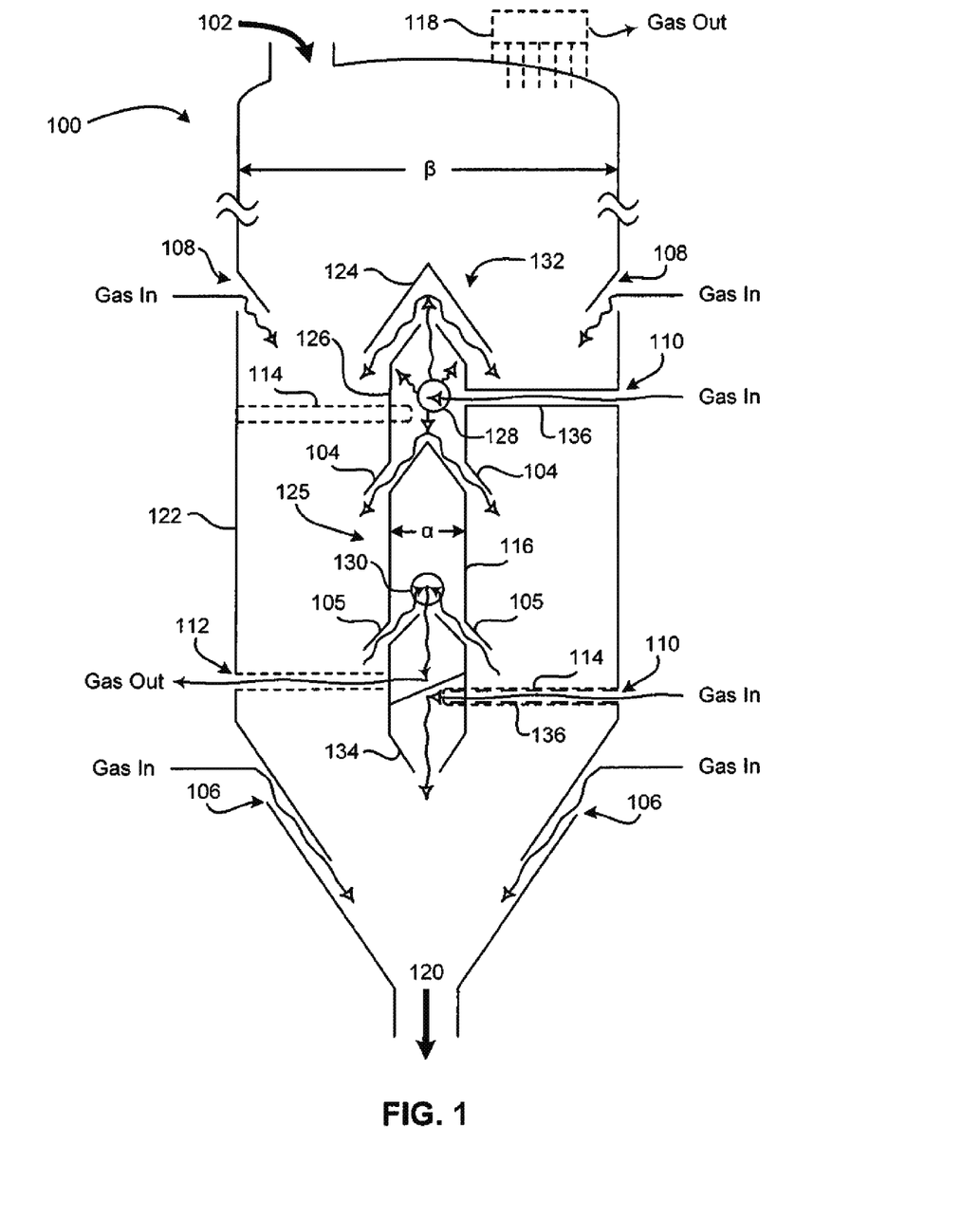
FIG. 1 is an exemplary cross-sectional diagram of a system for adding and/or removing gas from a solids/gas mixture.

Now referring to FIG. 1, there is shown a system 100 for adding and/or removing gas from a solids/gas mixture in a barrier, which may be a bin, tube, pipe, etc., where the barrier may have any cross-sectional shape, such as a round, oval, polygonal, etc. For the sake of simplicity, and not limiting the invention in any way, the barrier has been depicted in FIGS. 1-3 as a purge bin 122, and all the descriptions accompanying the figures when referencing the barrier refer to a purge bin. However, the purge bin 122 and any type of barrier may be interchanged in the descriptions below without affecting the scope and breadth of the invention.

Generally, solids/gas mixture flow enters through an upper inlet 102 near the upper portion of the purge bin 122, continues through the purge bin 122, and exits through the lower discharge 120 of the purge bin 122. However, more than one inlet and outlet are possible, and several flows may be used in a single purge bin 122, along with other approaches of handling the solids/gas mixture flow.

In some embodiments, the purge bin 122 may include an insert 132, which may be comprised of an inverted cone 124 and a member 125. The inverted cone 124 and/or member 125 may have any cross-sectional shape, such as a round, oval, polygonal, etc. Moreover, the inverted cone 124 and/or member 125 may have a pointed tip, rounded tip, square tip, etc. In some preferred embodiments, the inverted cone 124 may have steep angles and smooth surfaces such that mass flow is promoted in the purge bin 122. The insert 132 may promote solids mass flow around the exterior surfaces thereof by having smooth surfaces, and in some embodiments, the member 125 may be comprised of any number of member sections, such as member sections 126, 116, 134, which may be included below the inverted cone 124 to maintain near plug flow in the annular space.

In some embodiments, the member 125 may be comprised of member sections which may have the same or different shapes and functionalities than other member sections. For instance, in FIG. 1, member section 126 is shown with two gas inlets, a gas flow path toward the inverted cone 124, and gas flow paths downward. Member section 116 is shown with a gas withdrawal point 130 that draws gas from the solids/gas mixture. In some embodiments, a portion of the gas may flow out of filter 118, and in preferred embodiments, substantially all gas may flow out of filter 118. However, gas may flow out of any withdrawal point in the purge bin 122 including the filter 118. The arrangement, design, and selection of each member section included with the inverted cone 124, if any, is a decision that depends on the desired effect of the insert 132 as a whole, and the number of and distribution of gas inlet and withdrawal points.

As shown, the inverted cone 124 may be a separate piece from the upper member section 126. In other approaches, the inverted cone 124 may be part of the upper member section 126, e.g., may be the upper end of the upper member section 126.

In some embodiments, an outer diameter of the member 125 may be from about 75% to about 100% of an outer diameter of the inverted cone 124. Thus, the inverted cone 124 may have the same outside diameter as the member 125, resulting in an insert 132 having a substantially consistent outside diameter. In other approaches, the outer diameter of the member 125 may be greater than the outer diameter of the inverted cone 124. In some embodiments, the outer diameter of the member 125 may be from about 75% to about 90%, or from about 80% to about 90% of the outer diameter of the inverted cone 124. In other embodiments, the outer diameter of the member 125 may be from about 80% to about 100%, or from about 90% to about 100% of the outer diameter of the inverted cone 124.

In addition, the member 125 may be part of the purge bin 122, like an extension, or it may be an independent part. Preferably, the outer diameters referenced herein are measured at the points farthest apart of the referenced part, but may also refer to a median or average outer diameter thereof.

In some other embodiments, an outer diameter of the member 125 may be from about 50% and about 95% of an inner diameter of a portion of the purge bin 122 adjacent thereto. In another approach, an outer diameter of the inverted cone 124 and/or member 125 may be from about 50% and about 95% of an inner diameter of a portion of the purge bin 122 adjacent thereto. In some embodiments, the outer diameter of the inverted cone 124 and/or member 125 may be from about 50% to about 80%, or from about 55% to about 75%, or from about 60% to about 70%, of the inner diameter of a portion of the purge bin 122 adjacent thereto. In other embodiments, the outer diameter of the inverted cone 124 and/or member 125 may be from about 60% to about 95%, or from about 70% to about 85%, of the inner diameter of a portion of the purge bin 122 adjacent thereto. Thus, there may be a relationship between the outer diameter of the member 125 and/or of the inverted cone 124 and the inner diameter of the purge bin 122.

In some embodiments, skirts 108 on the interior walls of the purge bin 122 and skirts 104, 105 on the exterior walls of the insert 132 may provide void spaces below them to add or remove gas.

In some approaches, skirts 106 may be formed by having the upper portion of the purge bin 122 with a smaller internal diameter, and a lower portion of the purge bin 122 with a larger internal diameter, thereby defining a gap therebetween for transporting gas to or from the solids/gas mixture within the purge bin 122, as shown in FIG. 1. A conduit may transport gas to and/or from the skirt 106.

In some embodiments, a conduit 136 for transporting a gas to or from an area directly below the inverted cone 124, or any other section of the insert 132, such as member sections 126, 134 may be included. Note that in this and other embodiments, additional member sections of the insert 132 may form portions of a conduit 136, such as by being hollow, having internal conduit portions, etc.

In some approaches, one or more supports 114 may be provided from the purge bin 122 wall to the insert 132 to hold it in place and provide passage ways in or under the insert 132 to add or remove gas. The supports 114 may further provide an area for a conduit 136 to provide or remove gas from the surface interface of the solids/gas mixture, such as by housing the conduits, providing support for the conduits, holding the conduits, etc. One or more of the conduits 136 may also be connected to the insert 132 independently of one or more of the supports 114. For the sake of simplicity, each of the conduits 136 also is included with a support 114 in FIGS. 1-4, but this in no way limits the orientation, placement, and selection of the supports 114 and/or conduits 136 that can be used in any embodiments.

In some embodiments, all or some supports, conduits, pipes, etc., that pass through the flow area, including supports 114, may have a flow enhancing top edge, such as a knife edge, to minimize flow disruption.

In some embodiments, each conduit 136 may provide to or remove gas from the member 125 through skirts extending outwardly from the member 125. For example, a skirt, such as skirt 104, may wrap around one of the member sections, such as member section 126, such as shown in FIG. 1.

In some approaches, the skirts 104, 105, 108 preferably may have an almost uniform profile extending outwardly from the interior of the purge bin 122 and extending outwardly from the exterior of the insert 132. For example, the skirts 104, 105, 108 may wrap completely around the surface circumference of the part it is attached to, whether that part is the purge bin 122 or the insert 132.

In additional approaches, the skirts 104, 105, 108 may be segmented, and these segmented skirts may be placed on different locations relative to the longitudinal axis of the purge bin 122 and the insert 132, or may be placed at the same position relative to the purge bin 122 and the insert 132 longitudinal axis. In any approach, each skirt may be designed such that it has a constant structural member connected above and below the skirt in a manner which provides structural support for the parts above and below the skirt. In this way, a single support 114 may be used to support each insert 132 rather than having multiple supports 114.

In several approaches, each skirt, such as skirts 104, 105, 108, may include a friction-reducing coating on at least the exterior, solids/gas mixture contacting surfaces. Illustrative friction-reducing coatings include fluoropolymers such as polytetrafluoroethylene (PTFE), fluorinated ethylene-propylene (FEP), PLASITE 7122 TFE, etc. Some of the preferred coatings are sold under the TEFLON® name brand, and may be obtained from DUPONT having a sales office in Wilmington, Del., USA.

In some embodiments, a member 125 under the inverted cone 124 has dimensions that cause the solids/gas mixture passing therealong between the member and the purge bin 122 to have about a constant velocity profile thereacross may be included. A member section, such as member section 126, may allow addition of gas to the solids/gas mixture. As shown in FIG. 1, there may be a port near the upper portion of member section 126 that allows gas to escape into the solids/gas mixture after being deflected off the inverted cone 124. In addition, skirts such as skirts 104 may surround the lower circumference of the member section 126 such that gas may be added to the solids/gas mixture. One or more member sections may be used in any insert 132, depending on several factors including length of the purge bin 122, flow velocity of the solids/gas mixture, gas flow rate, etc.

In some approaches, another type of member section may be used which does not have a gas port on the upper portion.

One or more of these member sections 116 may be used with each insert 132. The member section 116 may allow removal of gas from the surface interface of the solids/gas mixture. In other approaches, a member section 116 may allow addition of gas to the solids/gas mixture, by simply providing a gas supply to this member section 116, which may be provided through an independent conduit, or may be provided through a gas conduit which also provides gas to another member section, such that another conduit does not need to be included in the solids/gas mixture flow path. To accomplish this, a gas supply conduit may be included internally of the insert 132, such that each member section which provides gas to the solids/gas mixture is supplied from a single gas conduit, allowing a single support 114 to fully support the insert 132. Examples of this internal gas supply conduit include a pipe, tube, passage, etc., that may run vertically along each member section comprising the insert 132, such that each member section is capable of pulling gas from the common supply.

In some approaches, a member section, such as member section 134, may provide and remove gas from the surface interface of the solids/gas mixture, by having an internal baffle which isolates at least one chamber from at least another chamber, with independent conduits capable of providing gas and removing gas simultaneously. The independent conduits may have the same support 114, may be independently supported, or may be independently piped from the supports 114. This section or any other may have a lower port for providing gas downward at the bottom of the insert 132, depending on which type of member section is placed in the bottom position of the insert 132.

In other approaches, a member section under the inverted cone 124 may only remove gas from the surface interface of the solids/gas mixture, by having an internal withdrawal point, which is connected to a gas discharge 112, with this connection possibly associated with a support 114.

In some preferred approaches, the lowest member section under the inverted cone 124 may be tapered such that the lower portion of the lowest member section may have a smaller exterior diameter than the upper portion of the lowest member section, as shown in FIG. 1, thus promoting more uniform solids/gas mixture flow across the external surfaces of the member 125. The lowest member section may also include a gas injection point such that gas may be added to the solids/gas mixture at some point near the lower portion of the lowest member section, such as shown in member section 134.

The angle of the cone 124 and skirts 104, 105, 108 may be sufficiently steep as to allow the solids/gas mixture to slide on the exterior cone 124 and skirt 104, 105, 108 surfaces and may promote solids mass flow. Preferably, the flow of solids vertically downward through the purge bin 122 may approach plug flow.

Each cone 124 and skirts 104, 105, 108 may have a "void space" below that includes an angle of repose depending on the characteristics of the solids/gas mixture and the angle of the cone 124 or skirts 104, 105, 108. The void space under the cone 124 and skirts 104, 105, 108, due to the angle of repose of the solids/gas mixture, may provide a surface interface within the purge bin 122 to add or remove gas, as will be explained in more detail in the description of FIG. 4.

By minimizing the distance between the member 125 exterior and purge bin 122 interior by selecting a large diameter for the member diameter $\alpha$ in comparison to the purge bin interior diameter $\beta$, protrusion of the cone 124 and skirts 104, 105, 108 into the solids/gas mixture flow path may be minimized. This in turn may minimize any undesired changes in the solids/gas mixture's flowing velocity, thus resulting in substantially plug flow.

In some particularly preferred embodiments, multiple gas discharge points, such as gas discharge point 128, may be included with all or some member sections, such as member sections 126 and/or 116, and/or under the inverted cone 124, and/or at skirts 106 and/or 108, such that gas inlet flow may be individually controlled for each discharge point and/or for each member section, skirt, and/or the inverted cone 124.

In additional embodiments, multiple gas withdrawal points, such as gas withdrawal point 130, may be included with some or all member sections, such as member section 126 or 116, and/or under the inverted cone 124, and/or at skirts 106 and/or 108, such that gas withdrawal flow may be individually controlled for each withdrawal point and/or for each member section, skirt, and/or the inverted cone 124.

In some embodiments, a single gas discharge point 128 may be used within a plenum inside a member section, such as member section 126 or 116, connected to a skirt, such as skirt 104, to provide a uniform flow of gas to the surface interface of the solids/gas mixture in the purge bin 122. Similarly, in some embodiments, a single gas withdrawal point 130 within a plenum inside cylinder member section, such as member section 116 connected to a skirt, such as skirt 105, may provide a uniform flow of gas away from the surface interface of the solids/gas mixture in the purge bin 122.

In particularly preferred embodiments, multiple inlet nozzles 110 may be used for purge bin wall skirts 108 and cone skirts 104 to distribute the gas flow more evenly.

In other embodiments, multiple withdrawal points 130 may be provided for more uniform removal of gas away from the surface interface of the solids/gas mixture in the purge bin 122.

The benefits of these embodiments are that the insert 132 may promote solids mass flow in the purge bin 122 while the solids/gas mixture maintains a mass flow pattern wherein the solids flow may approach plug flow in the gas injection and removal sections. For example, near plug flow may be achieved under the influence of gravity, where the skirt protrusion(s) at the larger diameters maximize the area under each of them and minimize the solids/gas mixture velocity changes. Having one insert 132 minimizes the supports 114 required to support it, compared to multiple inverted cones each requiring its own support(s). The insert design disclosed herein should promote a solids flow pattern that more closely approaches plug flow than designs that utilize multiple internal cones.

Figure 2:
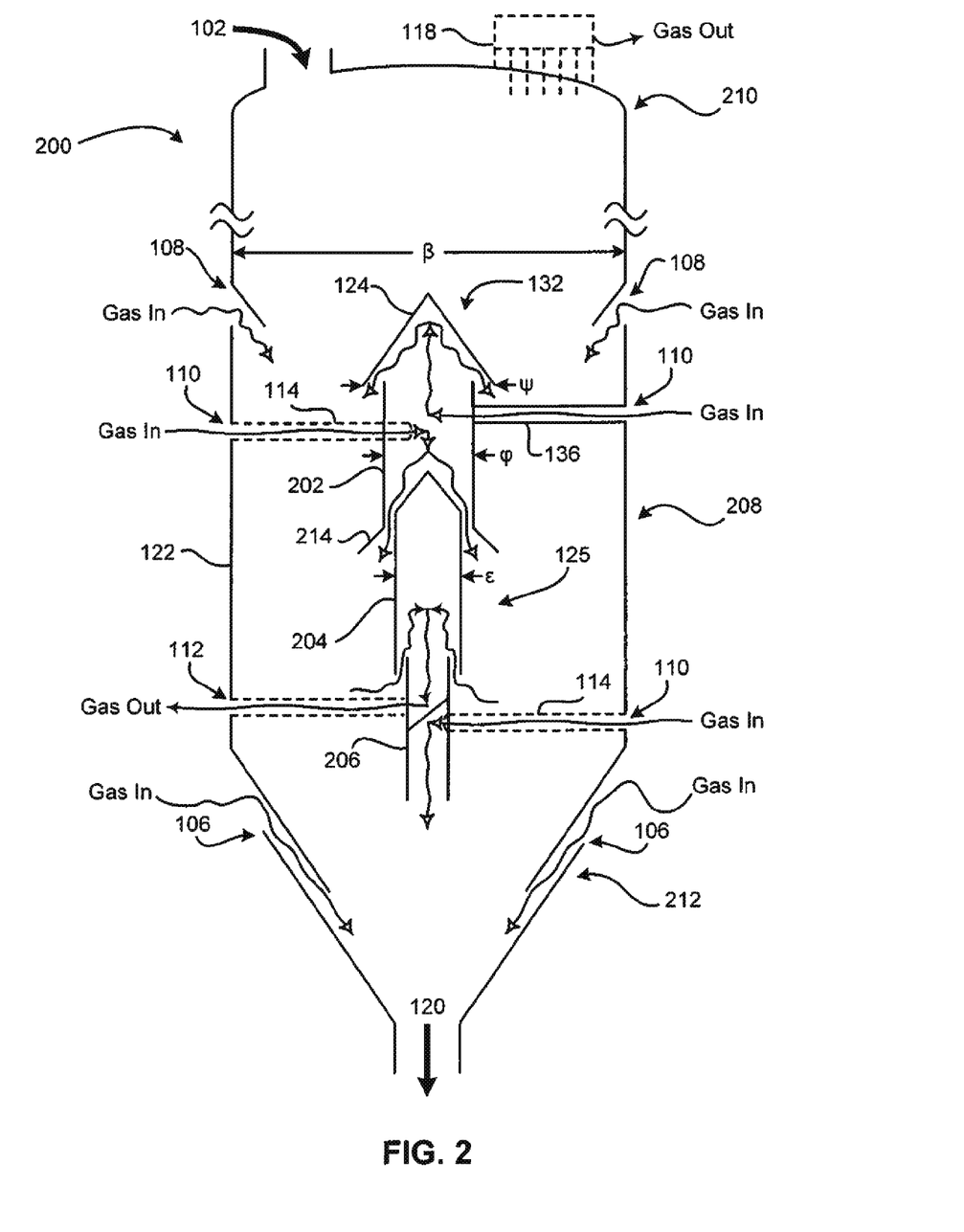
FIG. 2 is an exemplary cross-sectional diagram of a system for adding and/or removing gas from a solids/gas mixture.

Now referring to FIG. 2, all of the previous definitions may apply to this description, such as a barrier being described as a purge bin 122. With continued reference to FIG. 2, a system 200 is shown for adding and/or removing gas from a solids/gas mixture in a purge bin 122 which may have a central portion 208 between an opposite upper end 210 and lower end 212 thereof, the central portion 208 having about a constant inner diameter $\beta$ therealong. Also, the system 200 may include an insert 132, which may be comprised of a member 125, in the purge bin 122 towards a lower end thereof, wherein an outer diameter of the member 125 may be from about 50% and about 95% of an inner diameter of a portion of the purge bin 122 adjacent thereto. In some embodiments, the outer diameter of the member 125 may be from about 50% to about 80%, or from about 55% to about 75%, or from about 60% to about 70%, of the inner diameter of a portion of the purge bin 122 adjacent thereto. In other embodiments, the outer diameter of member 125 may be from about 60% to about 95%, or from about 70% to about 85%, of the inner diameter of a portion of the purge bin 122 adjacent thereto. Further, the system 200 may include an inverted cone 124 for deflecting solids/gas mixture from a top end of the purge bin 122.

Any of the previous embodiments described with reference to FIG. 1 may apply in the context of the design of member 125 and insert 132. In some approaches, an optional skirt 214 may extend outwardly from the insert 132. Also, a skirt 108 may extend outwardly from the purge bin 122, and may extend the entire inner circumference of the purge bin 122. A conduit may transport gas to or from an area below the skirt 108 to provide or remove gas from a surface interface of the solids/gas mixture.

For example, member 125 may include multiple member sections 202, 204, 206 where each member section may have a smaller diameter than a member section immediately above it, thereby defining a gap therebetween, such that gas may pass through the gap into or from a solids/gas mixture interface below each gap. This gap may be widened by including skirts 214, but is capable of exchanging gas with the solids/gas mixture in the absence of these skirts.

The lower section 206 or any other section of the insert 132 may be a combination section, whereas gas is both provided to and taken away from the solids/gas mixture above and below the combination section. For clarity, lower section 206 is shown as a combination section, but this in no way limits the functionality of the lower section of the insert 132.

In some approaches, an outer diameter, or diameters, e.g., $\phi$, $\epsilon$ of the member 125 may be from about 50% and about 100% (or greater), alternatively, from about 75% and about 100% of an outer diameter $\psi$ of the inverted cone 124. In some embodiments, the outer diameter, e.g., $\phi$, $\epsilon$, of the member 125 may be from about 75% to about 90%, or from about 80% to about 90% of the outer diameter $\psi$ of the inverted cone 124. In other embodiments, the outer diameter, e.g., $\phi$, $\epsilon$, of the member 125 may be from about 80% to about 100%, or from about 90% to about 100% of the outer diameter $\psi$ of the inverted cone 124. The outer diameter $\phi$, $\epsilon$, etc. of each member section of the member 125 may adhere to this ratio, or only the largest outer diameter $\psi$ may adhere to this ratio. For example, in one embodiment, $\phi$ is from about 75% to about 100%, or from 85% to 100%, or from 85% to 95%, of $\psi$ and $\epsilon$ is from about 75% to about 90%, or from about 75% to about 85%, or from about 80% to about 85% of $\psi$.

Figure 3:
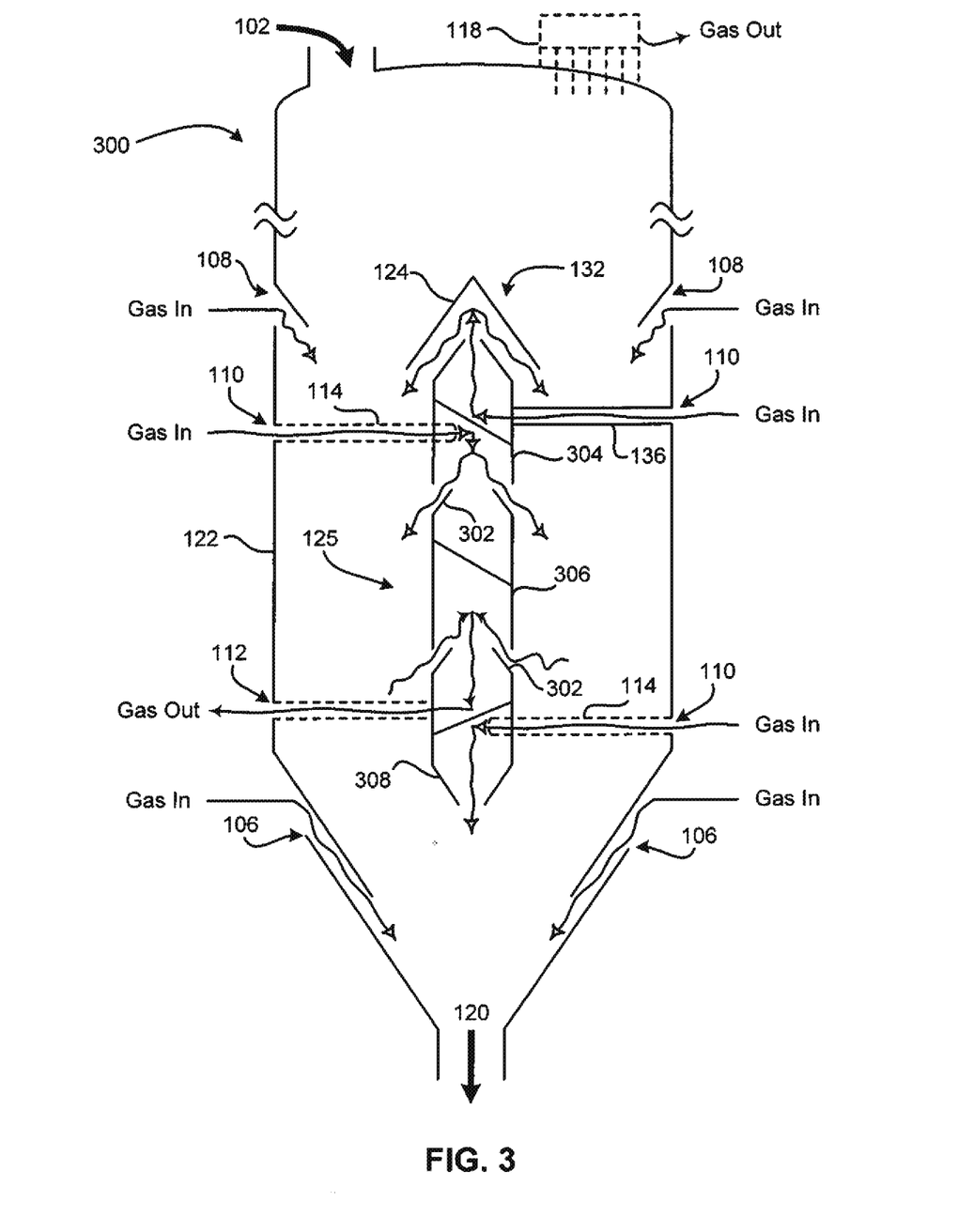
FIG. 3 is an exemplary cross-sectional diagram of a system for adding and/or removing gas from a solids/gas mixture.

In other approaches, a skirt may extend inwardly from the insert, as shown in FIG. 3, and a conduit 136 may be included for transporting a gas to or from an area above the skirt.

Now referring to FIG. 3, all of the previous definitions may apply to this description, such as a barrier being described as a purge bin 122. With continued reference to FIG. 3, in some embodiments, a system 300 is shown for adding and/or removing gas from a solids/gas mixture in a purge bin 122 which may include an insert 132, which may be comprised of a member 125. In several embodiments, the member 125 may have a skirt 302 extending inwardly from the member 125, and a conduit 136 for transporting a gas to or from an area above the skirt 302.

In some embodiments, the member 125 may be comprised of multiple member sections, such as member sections 304, 306, 308, with an inverted cone 124 above the upper member section 304. .

With this design of the member 125, any of the aforementioned embodiments may be implemented, such as purge bin 122 skirts 108, supports 114, gas inlets 110, gas discharges 112, bottom skirts 106, etc.

Figure 4:
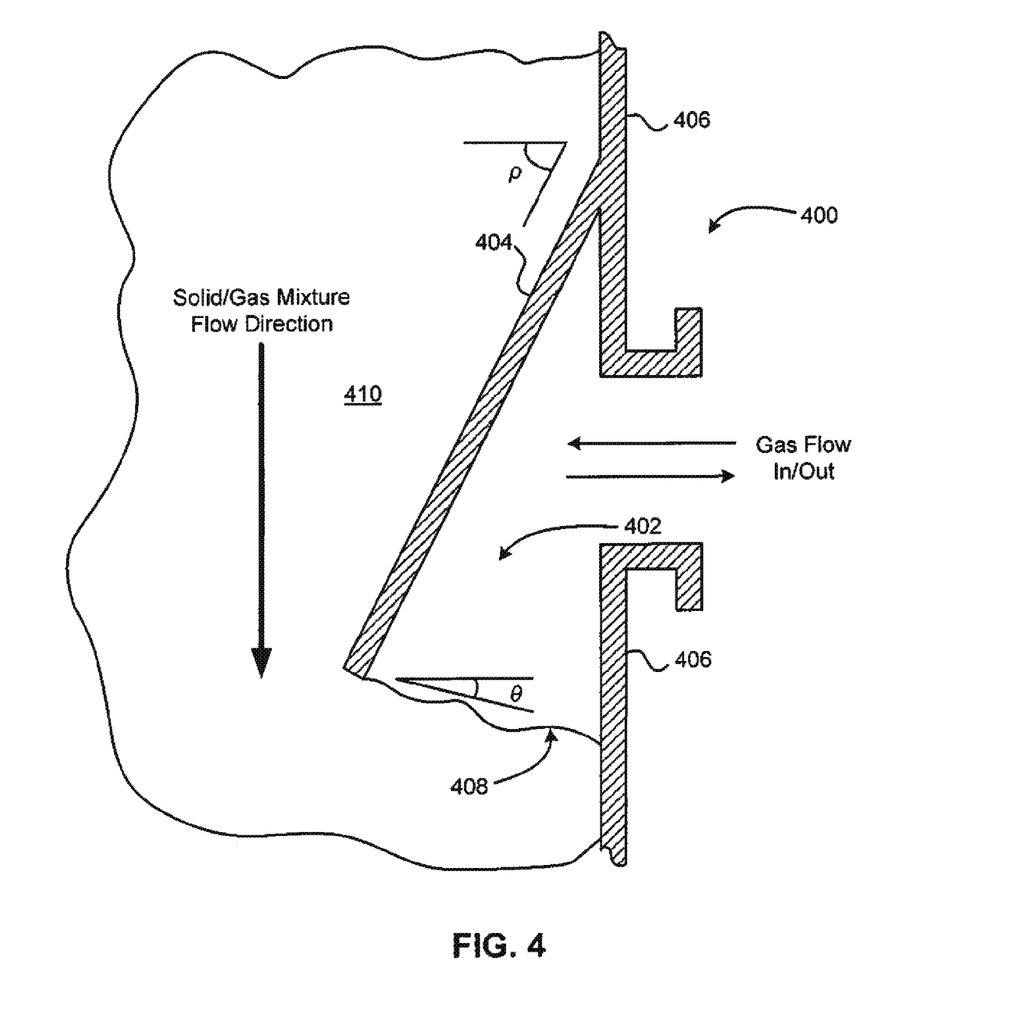
FIG. 4 is an exemplary cross-sectional diagram of a skirt for adding and/or removing gas from a solids/gas mixture.

Now referring to FIG. 4, a more detailed cross-section of an exemplary "skirt" is shown according to some embodiments. Gas generally may flow in and out of the gap in the skirt 400, possibly with a conduit connected to the outer portion of the gap to provide and remove a gas. There may be a void space 402 below and adjacent to the gap in the skirt 400, such that gas may enter the barrier or purge bin, allowing contact with a surface interface 408 between the solids/gas mixture 410 and the provided and/or removed gas.

The angle of repose $\theta$ determines the area of this surface interface 408 between the solids/gas mixture 410 and gas or gases. The area of this surface interface 408 may be chosen so as not to fluidize the solids/gas mixture 410 as gas is added and/or removed. If the solids/gas mixture 410 becomes fluidized, bubbles may form which may rise to the surface, an unwanted result.

In some preferred embodiments, the angle $\rho$ of the skirt 404 may be about $70°\pm15°$ from perpendicular to the purge bin wall 406. In other embodiments, the angle $\rho$ of the skirt 404 may be about $70°\pm10°$, or $70°\pm5°$, from perpendicular to the purge bin wall 406.

A method for purging a gas from a solid/gas mixture may be implemented in the context of the functionality and architecture of any one of FIGS. 1-5. Of course, however, the method may be carried out in any desired environment.

In the method, solids may be added to a barrier or purge bin having an inverted cone therein and a member under the inverted cone, wherein the solids or solids/gas mixture passing along the member may have about a constant vertical velocity profile thereacross. This about constant vertical velocity profile may approach plug flow.

In the method, a purge gas may be injected into the solids or solids/gas mixture from at least one point adjacent the member.

In some approaches, a gas may be injected or extracted from the solids or solids/gas mixture from an area below the inverted cone, such as shown in FIG. 1, as inverted cone 124.

A skirt which may extend inwardly from the member, such as shown in FIG. 3 as skirt 302, may be used in some approaches to inject or extract a gas from an area above the skirt.

In some embodiments, a gas may be injected or extracted from the solids or solids/gas mixture from an area below a skirt extending outwardly from the member, such as shown in FIG. 1, as skirt 104. Further, in some embodiments, a gas may be injected or extracted from the solids or solids/gas mixture from an area below a skirt extending outwardly from the barrier or purge bin, such as shown in FIG. 1, as skirt 108.

In several embodiments, an outer diameter of the member may be from about 75% and about 100% of an outer diameter of the inverted cone. In some embodiments, the outer diameter of the member may be from about 75% to about 90%, or from about 80% to about 90% of the outer diameter of the inverted cone. In other embodiments, the outer diameter of the member may be from about 80% to about 100%, or from about 90% to about 100% of the outer diameter of the inverted cone. Thus, the inverted cone may be a part of the member, or a separate piece. Preferably, the outer diameters mentioned herein are measured at the points farthest apart of the noted part, but may also refer to a median or average outer diameter.

The member may be comprised of multiple sections according to some embodiments, where each section may have a smaller diameter than a section immediately above it, thereby defining a gap therebetween, such as shown in FIG. 3. Further, gas may be injected or removed from the solids/gas mixture through the gap.

In some embodiments, an outer diameter of the member may be from about 50% and about 95% of an inner diameter of a portion of the barrier or purge bin adjacent thereto. In some embodiments, the outer diameter of the member may be from about 50% to about 80%, or from about 55% to about 75%, or from about 60% to about 70%, of the inner diameter of a portion of the barrier or purge bin adjacent thereto. In other embodiments, the outer diameter of the member may be from about 60% to about 95%, or from about 70% to about 85%, of the inner diameter of a portion of the barrier or purge bin adjacent thereto.

Figure 5:
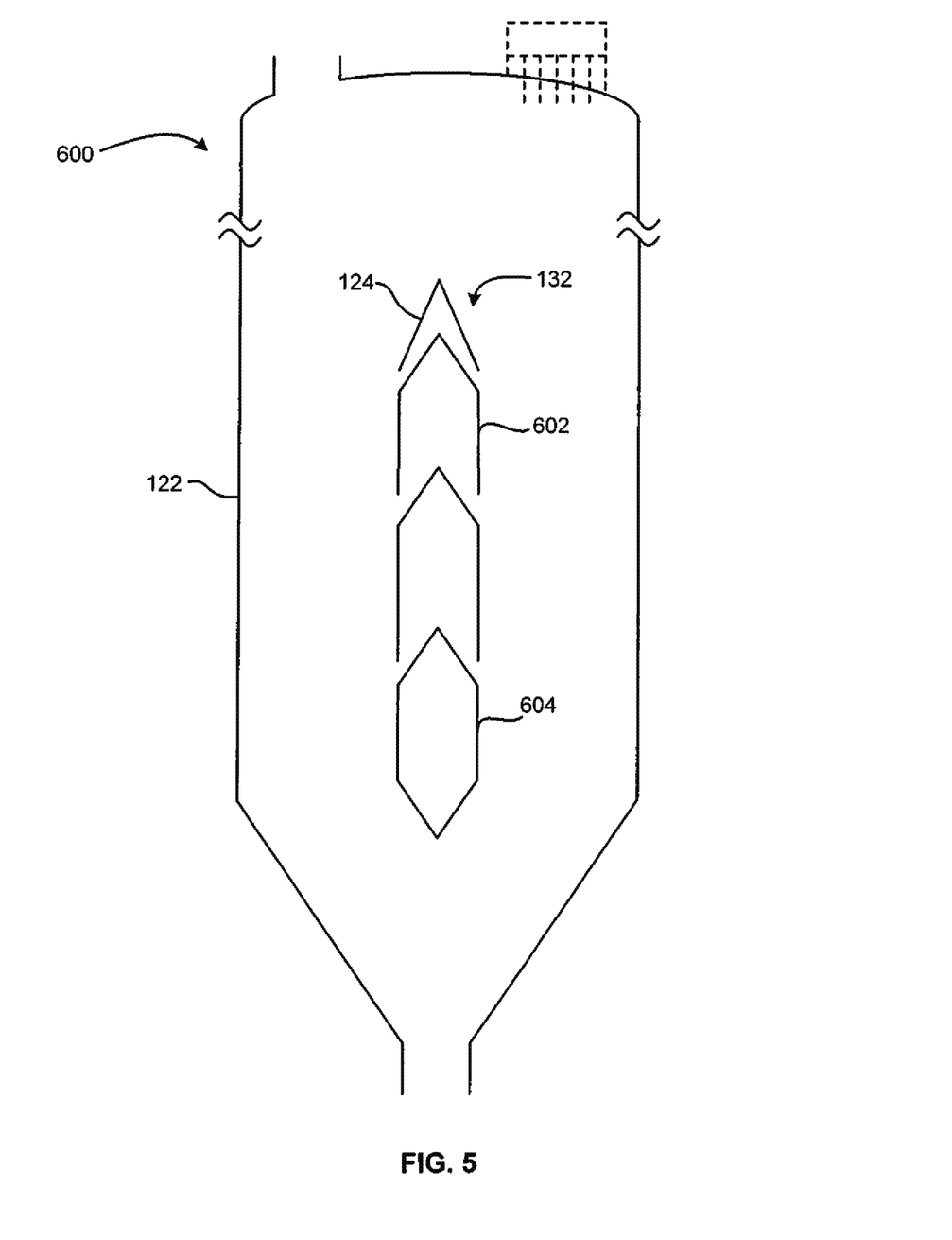
FIG. 5 is an exemplary cross-sectional diagram of a system for adding and/or removing gas from a solids/gas mixture.

Now referring to FIG. 5, a system 600 for adding and/or removing gas from a solids/gas mixture is shown according to one embodiment. Features of this embodiment may be incorporated into and used with any other embodiments disclosed herein or possible based on the disclosure. For instance, the cone 124 may be only as wide as the rest of the insert 132. Also, each member section 602 may be substantially similar in size and shape, or may differ in height, width, circumference, dimensions, functionality, etc., such as member section 604. The system 600 can have gas inlets, skirts, gas discharges, supports, conduits, etc., located at any number of locations according to the desired functionality and mass flow promoting properties of the overall system.

In some embodiments, all or some member sections may have an area where the solids/gas mixture flowing through the purge bin 122 may be exposed to gas and/or have gas removed. In addition, in some preferred embodiments, the angle of the inverted cone 124 exterior walls may be about 70°±15° from normal to the vertical axis thereof. In some embodiments, the angle of the inverted cone 124 exterior walls may be about 70°±10°, or about 70°±5° from normal to the vertical axis thereof. Also, in some preferred embodiments, the angle of the walls of the upper portion of some or all member sections, which typically will be enveloped by the section immediately above, may be about 60°±15° from normal to the vertical axis thereof. In some embodiments, the angle of the walls of the upper portion of some or all member sections, which typically will be enveloped by the section immediately above, may be about 60°±10°, or about 60°±5° from normal to the vertical axis thereof. Of course, more or fewer member sections may be included in any embodiment, and member sections may provide additional functionality beyond adding and/or removing gas, and promoting mass flow around the insert 132.

The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the invention, additionally, they do not exclude impurities and variances normally associated with the elements and materials used.

Only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All documents cited herein are fully incorporated by reference for all jurisdictions in which such incorporation is permitted and to the extent such disclosure is consistent with the description of the present invention.

While the invention has been described with respect to a number of embodiments and examples, those skilled in the art, having benefit of this disclosure, will appreciate that other embodiments can be devised which do not depart from the scope and spirit of the invention as disclosed herein.

What is claimed is:

1. A system, comprising:
    a vessel;
    an inverted cone in the vessel; and
    a member under the inverted cone and having dimensions that cause solids passing therealong between the member and the vessel to have about a constant velocity profile thereacross,
        wherein the member further comprises a skirt extending outwardly from the member and a conduit for transporting a gas to or from an area below the skirt, and/or a skirt extending inwardly from the member and a conduit for transporting a gas to or from an area above the skirt.

2. A system as recited in claim 1 in which the vessel has a central portion between opposite upper and lower ends thereof, the central portion having about a constant inner diameter therealong, and in which the member is located in the vessel towards a lower end thereof, wherein an outer diameter of the member is from about 50% and about 95% of an inner diameter of a portion of the vessel adjacent thereto.

3. The system of claim 1, further comprising a conduit for transporting a gas to or from an area below the inverted cone.

4. The system of claim 1, further comprising a skirt extending outwardly from the vessel, and a conduit for transporting a gas to or from an area below the skirt.

5. The system of claim 1, wherein the member includes multiple sections, where each section has a smaller diameter than a section immediately above it, thereby defining a gap therebetween.

6. The system of claim 1, further comprising a friction-reducing coating on the inverted cone.

7. The system of claim 1, wherein an outer diameter of the member is from about 75% and 100% of an outer diameter of the inverted cone.

8. The system of claim 1, wherein an outer diameter of the member is from about 50% and about 95% of an inner diameter of a portion of the vessel adjacent thereto.

9. A method for purging a gas from a solid/gas mixture, comprising:
    adding solids to a vessel having an inverted cone therein and a
        member under the inverted cone, wherein the solids passing along the member have about a constant vertical velocity profile thereacross; and
        wherein the member further comprises a skirt extending outwardly from the member and a conduit for transporting a gas to or from an area below the skirt, and/or a skirt extending inwardly from the member and a conduit for transporting a gas to or from an area above the skirt; and
    injecting a purge gas into the solids from at least one point adjacent the member.

10. The method as recited in claim 9, further comprising injecting or extracting a gas from an area immediately under the inverted cone.

11. The method of claim 9, further comprising injecting or extracting a gas from an area below a skirt extending outwardly from the member.

12. The method of claim 9, further comprising injecting or extracting a gas from an area below a skirt extending outwardly from the vessel.

13. The method of claim 9, wherein the member includes multiple sections, where each section has a smaller diameter than a section immediately above it, thereby defining a gap therebetween, and injecting or extracting a gas from the gap.

14. The method of claim 9, further comprising injecting or extracting a gas from an area above a skirt extending inwardly from the member.

15. The method of claim 9, wherein an outer diameter of the member is from about 75% and 100% of an outer diameter of the inverted cone.

16. The method of claim 9, wherein an outer diameter of the member is from about 50% and about 95% of an inner diameter of a portion of the vessel adjacent thereto.

* * * * *